United States Patent

[11] 3,588,857

[72] Inventors Gunter J. Gessner
Maywood;
Donald P. Vargo, Nutley, N.J.
[21] Appl. No. 685,392
[22] Filed Nov. 24, 1967
[45] Patented June 28, 1971
[73] Assignee The Bendix Corporation

[54] FAIL SAFE MONITOR
4 Claims, 4 Drawing Figs.

[52] U.S. Cl. .......... 340/213, 340/169, 340/172
[51] Int. Cl. .......... G08b 23/00
[50] Field of Search .......... 340/248, 213, 169, 172, 164, 149

[56] References Cited
UNITED STATES PATENTS
3,473,151 10/1969 Moreines et al. .......... 340/213X

*Primary Examiner*—Donald J. Yusko
*Assistant Examiner*—Perry Palan
*Attorneys*—Anthony F. Cuoco and Plante, Arens, Hartz, Smith and Thompson

ABSTRACT: A fail safe monitor including an amplitude detector within an oscillator loop. A signal corresponding to the difference between a pair of redundant signals is compared to a reference signal. If the difference signal exceeds a predetermined threshold, the oscillator will stop and thereby cause an alarm device to be actuated. If the difference signal is less than the threshold, the oscillator will continue to oscillate and the comparator will be in the safe state. The comparator has independent dual outputs so that in the event of a failure of one output, the other output functions normally.

INVENTORS
GUNTER J. GESSNER
DONALD VARGO
BY Anthony A. Lucco
ATTORNEY

INVENTORS
GUNTER J. GESSNER
DONALD VARGO
BY [signature]
ATTORNEY

INVENTORS
GUNTER J. GESSNER
DONALD VARGO
BY Anthony J. Lucas
ATTORNEY

FAIL SAFE MONITOR

CROSS-REFERENCE TO RELATED APPLICATIONS

The device of the present invention is an improvement over the monitoring devices disclosed and claimed in copending application Ser. Nos. 545,027 and 633,286 filed Apr. 25, 1966 and Apr. 24, 1967, respectively, by Harold Moreines and Gunter J. Gessner and assigned to The Bendix Corporation, assignee of the present invention, said application Ser. No. 633,286 having issued as U.S. Pat. No. 3,473,151 on Oct. 14, 1969.

BACKGROUND OF THE INVENTION

1. Field of the Invention

The present invention relates to monitoring signals provided by redundant control systems. More particularly, the invention relates to a fail safe monitor for comparing two direct current or demodulated alternating current signals and for providing a discrete output change when the difference between the input signals exceeds a predetermined threshold.

2. Description of the Prior Art

In monitor systems of the type described in the aforenoted copending application Ser. Nos. 545,027 and 633,286, and wherein error detection depends on pulse frequency, variations in frequency affect the threshold at which an alarm device is actuated. Moreover, the threshold is unstable over an operating temperature range of approximately 55 C to 100 C. Prior to the present invention expensive components had to be used to compensate for these inadequacies.

SUMMARY OF THE INVENTION

The signal monitor of the present invention includes an oscillator loop having therein a differential amplifier, an amplitude detector and first and second multivibrators. An oscillating cycle is started by applying a start pulse to the first multivibrator which is thereupon switched to its unstable state for a predetermined interval after which it reverts to its stable state to provide a first pulse. The first pulse is applied to the second multivibrator which is thereupon switched to its unstable state for a predetermined interval after which it reverts to its stable state to provide a second pulse. The second pulse is summed with one of a pair of redundant signals and the summation signal and the other redundant signal are applied to a difference amplifier. An amplitude detector detects the level of the signal from the difference amplifier relative to a reference signal. If the output of the differential amplifier is above a predetermined threshold, the oscillator will stop and an alarm device will be actuated. If the output is below the threshold, oscillator operation will be sustained.

One object of this invention is to provide a fail safe monitor having the capability of comparing two direct current or demodulated alternating current signals and to provide a discrete output change when the difference between said signals exceeds a predetermined threshold.

Another object of this invention is to provide a monitor of the type described that is fail safe for all open and short circuit conditions internal to the monitor.

Another object of this invention is to provide a monitor of the type described and having high stability over a relatively wide operating temperature range.

Another object of this invention is to provide a monitor of the type described and wherein variations in oscillator frequency do not effect the predetermined threshold level.

Another object of this invention is to provide a monitor having independent dual outputs so that if one output fails the other output will function normally.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
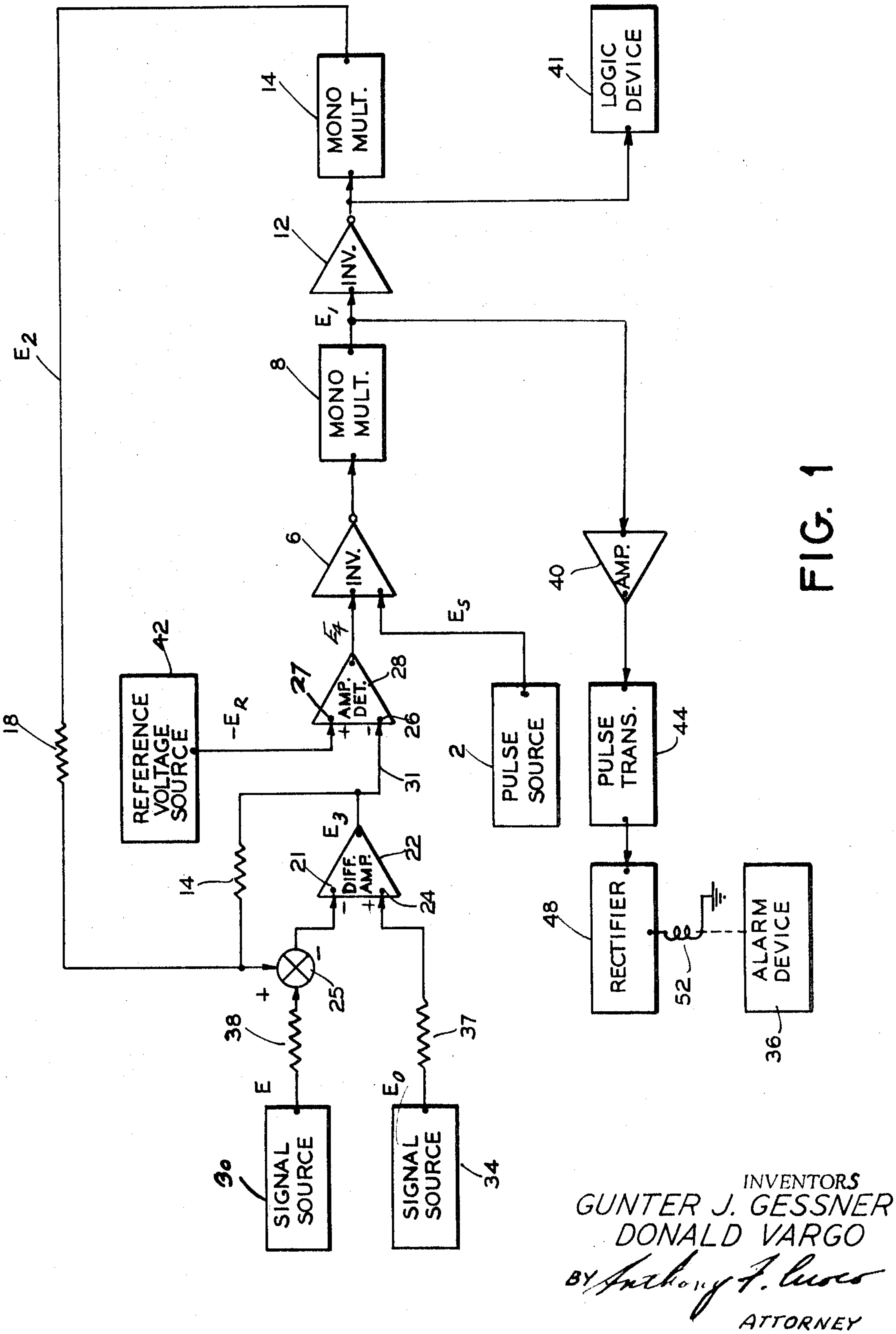
FIG. 1 is an electrical schematic diagram showing the monitor of the present invention.
Figure 2:
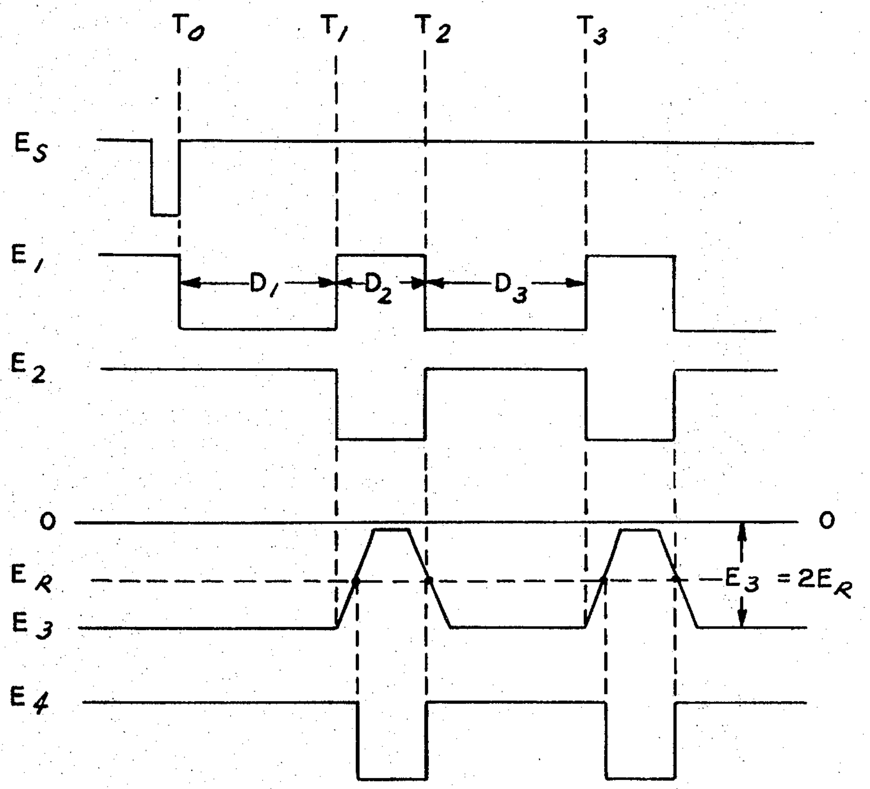
FIG. 2 is a graphical representation showing the pulse forms provided at various stages of operation of the monitor shown in FIG. 1.

At a time designated as $T_0$ in the graphical representation of FIG. 2, an oscillating cycle is started by a pulse $E_s$ having a negative waveform as shown in FIG. 2 and applied from a pulse source 2 to an inverter 6 shown in FIG. 1. Inverter 6 inverts the pulse from pulse source 2, and which inverter pulse is applied to a monostable multivibrator 8 of a type generally shown and described at page 200, Basic Theory and Application of Transistors, Department of the Army, 1959, and having a stable and an unstable state. Multivibrator 8 is initially in its stable state and is triggered to its unstable state by the pulse from inverter 6 remaining in its unstable state during the interval $T_0$ to $T_1$ otherwise shown as $D_1$ in FIG. 2. At time $T_1$, multivibrator 8 reverts to its stable state providing a positive pulse $E_1$ during the interval $T_1$ to $T_2$ otherwise shown as $D_2$ in FIG. 2. Positive pulse $E_1$ is applied to an inverter 12 which inverts the pulse and which inverted pulse is applied to a monostable multivibrator 14. Multivibrator 14 is similar to multivibrator 8 and is initially in its stable state. Multivibrator 14 is triggered to its unstable state by the pulse from inverter 12 remaining in its unstable state during the interval $T_1$ to $T_2$ and at the end of which interval ($T_2$) multivibrator 14 provides a positive pulse $E_2$ during the interval $T_2$ to $T_3$ otherwise shown as $D_3$ in FIG. 2. Multivibrator 14 is connected through a resistor 18 to a summation means 25, and which summation means 25 is connected to an inverting input 21 of a difference amplifier 22 having a noninverting input 24. A resistor 14 is connected in feedback configuration to amplifier 22, i.e. connected to summation means 25 and to the output of amplifier 22.

The system monitored by the device of the present invention may be a dual channel aircraft control system including a signal device 30 for providing a direct current or demodulated alternating current aircraft control signal E and a signal device 34 for providing a direct current or demodulated alternating current signal $E_0$ corresponding to signal E. When the aircraft control device is operating properly, signal E from signal device 30 and signal $E_0$ from signal device 34 differ in amplitude within predetermined limits. When a system malfunction occurs, i.e., when the difference between signals E and $E_0$ exceeds the predetermined limits, the monitoring device of the present invention brings into operation an alarm device 36.

Signal E from signal device 30 is applied through a resistor 38 to summation means 25 and summed thereat with the pulse $E_2$ from monostable multivibrator 14. The summation signal from summation means 25 is applied to inverting input 21 of differential amplifier 22 and signal $E_0$ from signal device 34 is applied through a resistor 37 to noninverting input 24 of differential amplifier 22. Differential amplifier 22 algebraically subtracts the inputs thereto and provides a pulse $E_3$ having a waveform as shown in FIG. 2.

Pulse $E_3$ is applied to an inverting input 26 of an amplitude detector 28. A constant negative voltage is applied from a reference voltage source 42 to a noninverting input 27 of amplitude detector 28, and which negative reference voltage is designated as $E_R$. The amplitude of reference voltage $E_R$ is equal to one half of the peak value of pulse $E_3$ from differential amplifier 22 as best shown in FIG. 2.

Amplitude detector 28 functions as a switch and each time pulse $E_3$ from differential amplifier 22 crosses reference voltage $E_R$, amplitude detector 28 will switch to provide a pulse $E_4$ having a waveform as shown in the graphical representation of FIG. 2. When pulse $E_4$ from amplitude detector 28 is positive going ($T_2$) monostable multivibrator 8 is again switched to its unstable state and the oscillation cycle is repeated.

The output of multivibrator 8 is applied to an amplifier 40 and the amplifier output is applied to a pulse transformer 44. The output of pulse transformer 44 is applied to a rectifier 48 and the rectifier output energizes a relay 52 whereupon the alarm device 36 is actuated to an "off" state. When a failure occurs, as will hereinafter be more fully described, the monitor will stop oscillating and the output of multivibrator 8 will be ineffective for energizing relay 52, whereupon the alarm device 30 is actuated to an "on" state indicating a system malfunction.

The output from inverter 12 may be applied to a logic device 41 for performing a predetermined function. With this independent dual output arrangement, if the output from multivibrator 8 fails, logic device 41 will still function as intended.

FAILURE DETECTION

When signals E and $E_o$ differ in amplitude within predetermined limits, difference amplifier 22 provides pulse $E_3$ as heretofore noted with the arrangement being that pulse $E_3$ has a peak amplitude twice the level of reference voltage $E_R$ as shown in FIG. 2. When signals E and $E_o$ differ in amplitude by a significant amount, the output from amplifier 22 is pulse $E_3$ plus a constant level signal corresponding to the difference between E and $E_o$, and which constant level signal may be represented as $A(E-E_o)$ wherein A is the closed loop gain of differential amplifier 22. This constant level signal has the effect of shifting pulse $E_3$ positive or negative depending on the polarity thereof as will next be shown.

The peak value of the signal applied to inverting input 26 of amplitude detector 28 may be represented as follows:

$$V=E_3+A\,(E-E_o)$$

Figure 3:
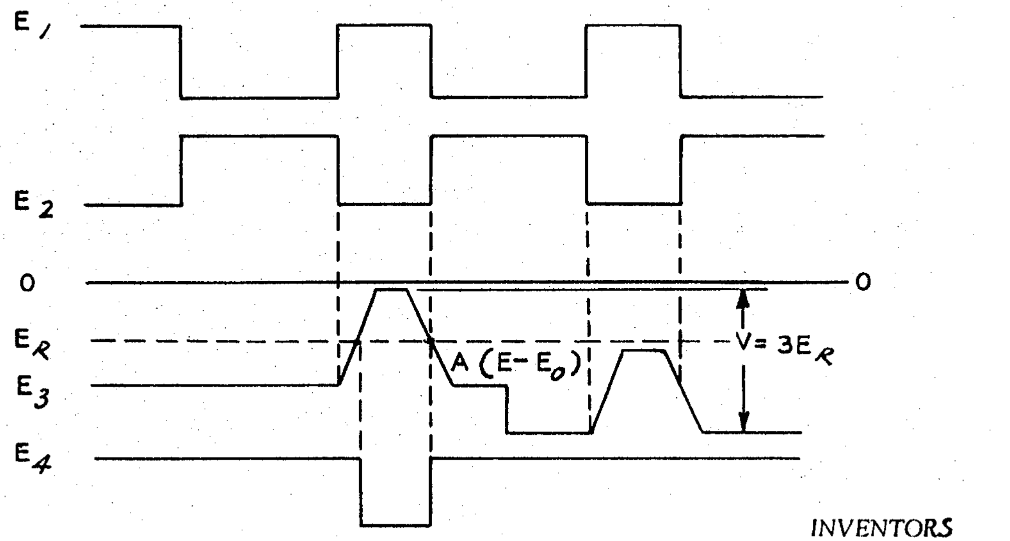
FIG. 3 is a graphical representation showing the pulse forms provided at various stages of operation of the monitor shown in FIG. 1 when the monitor is in a failure mode.
Figure 4:
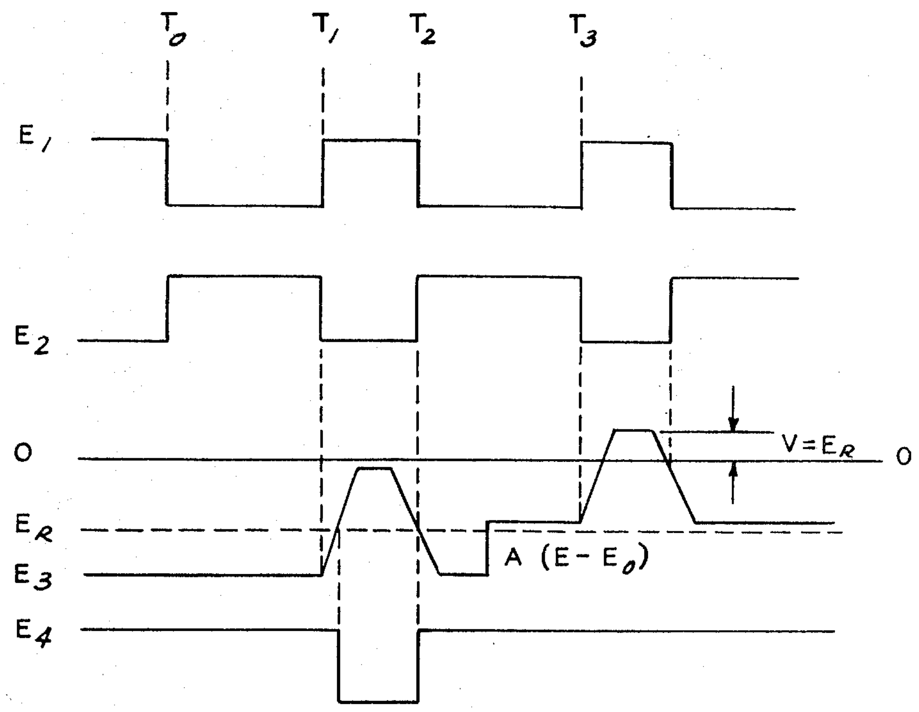
FIG. 4 is a graphical representation showing the pulse forms provided at various stages of operation of the monitor shown in FIG. 1 when the monitor is in another failure mode.

If $(E-E_o)$ is positive, the inversion at input 26 will drive pulse $E_3$ negative. When pulse $E_3$ is driven negative to an extent that $V=3\ E_r$ as shown in FIG. 3, the pulse will not cross over reference voltage $E_R$ and the oscillating cycle will stop, causing alarm device 36 to be actuated. If $(E-E_o)$ is negative, the inversion at input 26 will drive pulse $E_3$ positive. When pulse $E_3$ is driven positive to the extent that $V=E_R$ as shown in FIG. 4, the pulse $E_3$ will likewise not cross over reference voltage $E_R$ and the oscillating cycle will stop causing alarm device 36 to be actuated.

It may be seen from the aforegoing description of the present invention that variations in oscillator frequency will not affect the threshold at which the alarm device will be actuated. Thus, the monitor has relatively high stability over a wide temperature range and power supply variation. Additionally, the configuration of the monitor is such that the monitor will be fail safe for open and short circuit conditions internal to the monitor.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. A monitoring device for a system providing a pair of redundant signals, comprising:
   - means for providing a starting pulse;
   - an oscillator connected to said means and responsive to the starting pulse to start oscillating and for providing a first pulse;
   - means connected to the oscillator and responsive to the first pulse and responsive to the redundant signals for providing a second pulse in accordance with the difference between the redundant signals;
   - means for providing a constant level reference signal;
   - level detecting means connected to the second pulse means and to the reference signal means for providing a third pulse when the peak amplitude of the second pulse is twice the amplitude of the reference signal and for providing a constant level output when the peak amplitude of the second pulse is three times the amplitude of the reference signal and when said peak amplitude equals the amplitude of the reference signal;
   - means connecting the level detecting means to the oscillator, with the oscillator being affected by the third pulse to continue oscillating and affected by the constant level output to stop oscillating; and
   - means connected to the oscillator for indicating when oscillation continues and when oscillation stops.

2. A monitoring device as described by claim 1, wherein the oscillator includes:
   - a first inverter connected to the starting pulse means for inverting the pulse therefrom;
   - a first multivibrator connected to the first inverter and responsive to the inverted pulse for providing a fourth pulse;
   - a second inverter connected to the first multivibrator for inverting the fourth pulse; and
   - a second multivibrator connected to the second inverter for providing the first pulse in response to the inverted fourth pulse therefrom.

3. A monitoring device as described by claim 2, wherein:
   - the first inverter is connected to the level detecting means and affected by the third pulse so that the oscillator continues oscillating and affected by the constant level output so that the oscillator stops oscillating.

4. A monitoring device as described by claim 2, wherein:
   - the indicator is connected to the first multivibrator; and
   - a utilizing device is connected to the second inverter so as to be unaffected by the output of the first multivibrator.